June 21, 1966  E. GÖTZ ETAL  3,257,551
ARRANGEMENT FOR SUBTRACTING TWO NATURAL BINARY NUMBERS
Filed Feb. 8, 1963  2 Sheets-Sheet 1

Inventors:
Elmar Götz
Peter Boese
Hermann Kummer
Wolfgang Mahro
By: Spencer & Kaye
Attorneys June 21, 1966   E. GÖTZ ETAL   3,257,551
ARRANGEMENT FOR SUBTRACTING TWO NATURAL BINARY NUMBERS
Filed Feb. 8, 1963   2 Sheets-Sheet 2
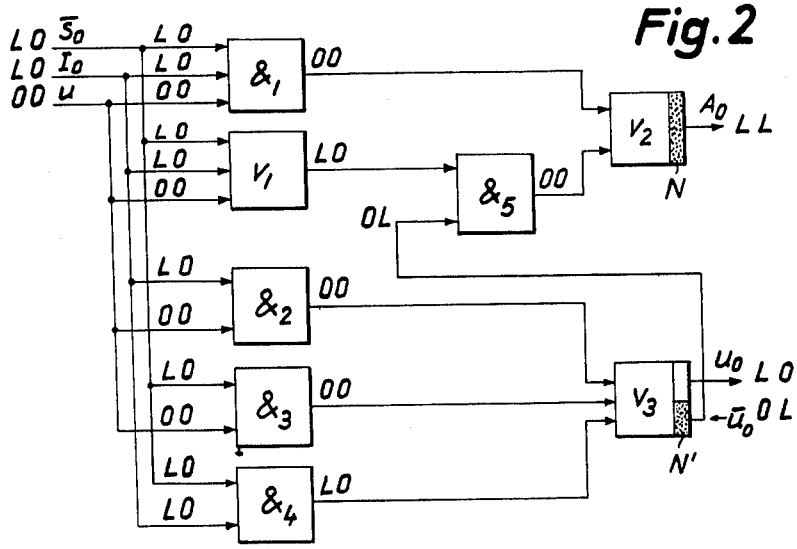
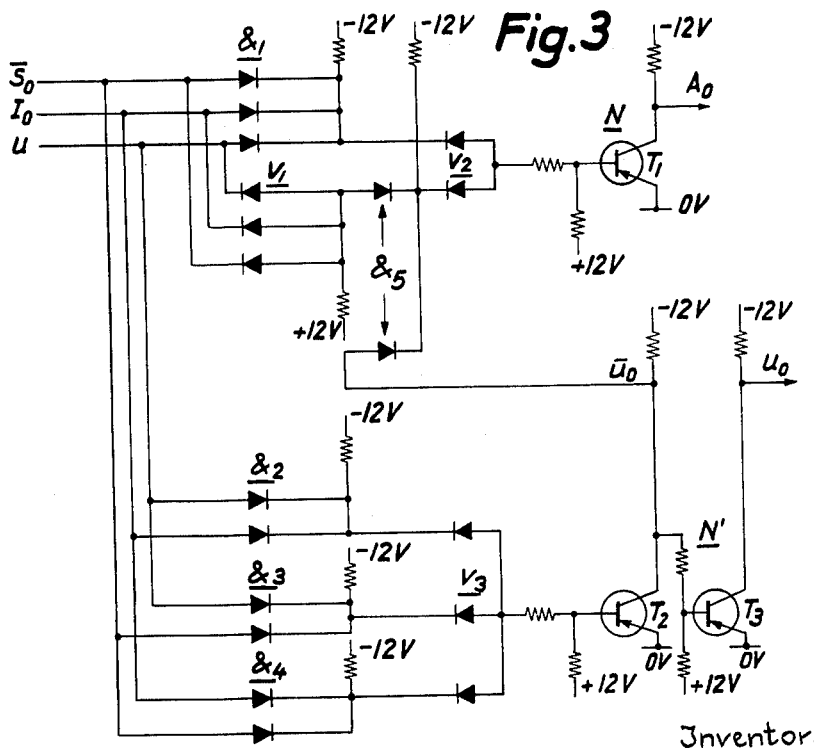
Inventors:
Elmar Götz
Peter Boese
Hermann Kummer
Wolfgang Mahro
By: *Spencer & Kaye*
Attorneys

United States Patent Office 3,257,551
Patented June 21, 1966

3,257,551
ARRANGEMENT FOR SUBTRACTING TWO
NATURAL BINARY NUMBERS
Elmar Gotz, Frankfurt-Gravenbruch, Peter Boese, Neu Isenburg, Hermann Kummer, Berlin-Grunewald, and Wolfgang Mahro, Berlin-Charlottenburg, Germany, assignors to Licentia Patent-Verwaltungs G.m.b.H., Frankfurt am Main, Germany
Filed Feb. 8, 1963, Ser. No. 257,269
Claims priority, application Germany, Feb. 12, 1962, L 41,216
5 Claims. (Cl. 235—175)

The present invention relates to an arrangement for subtracting one binary number from another.

Digital numbers are used more and more in the machine control art. There exist, for instance, machine control systems in which digital numbers are used as information, the numbers being, for example, in the form of digital D.C. voltage signals. Such systems use comparison members which receive the nominal and actual values in the form of natural binary numbers, which numbers are realized as D.C. voltages of different potential. In many cases, it is desired that the comparison members put out both the magnitude and algebraic sign of the difference between the two numbers. One practical application of this is in control systems for machine tools in which a work tool operates on a work piece. The position of the work tool relative to the work piece is controlled in accordance with a predetermined program which puts out the so-called "nominal" value, i.e., the desired or intended position which the tool is to occupy relative to the work piece while the "actual" value is, as the name implies, representative of the position which the tool actually occupies relative to the work piece, this last-mentioned position being measured by suitable gauges. The nominal value put out by the program is compared with the actual position measured by the gauges, so that the position of the tool may be brought to, or at least more closely to, the nominal value. The comparison should thus show whether there is any difference at all between the nominal and actual values, and if so, the absolute numerical value of this difference and also the direction in which the actual value differs from the nominal value, i.e., the algebraic sign of the difference.

It is, therefore, an object of the present invention to provide a substracting arrangement for carrying out the above task irrespective of whether the nominal value is greater than, smaller than, or equal to the actual value.

With the above object in view, the present invention resides in a subtracting arrangement for subtracting one natural binary number from another, which arrangement is characterized by the following features:

(A) Each digit of the binary numbers has assigned to it a subtracter for receiving one digit from each number, the digits being of the same order, and a carry.

(B) If the difference is positive, the subtracters put out the affirmative true result, while if the difference is negative, the subtracters put out the complement of a value related to the difference, which complement is inverted, by means of a logic circuit, into an affirmative result.

(C) The lowest-order digit of this affirmative result has added to it, by means of an adder, the carry of the subtracter assigned to the highest-order digit.

Additional objects and advantages of the present invention will become more apparent upon consideration of the following description when taken into conjunction with the accompanying drawings in which:

FIGURE 2 is a schematic diagram of one embodiment of a subtracter incorporated in the arrangement of FIGURE 1.

FIGURE 3 is a circuit digram showing the electrical components of a subtracter incorporated in the arrangement of FIGURE 1.

Figure 1:
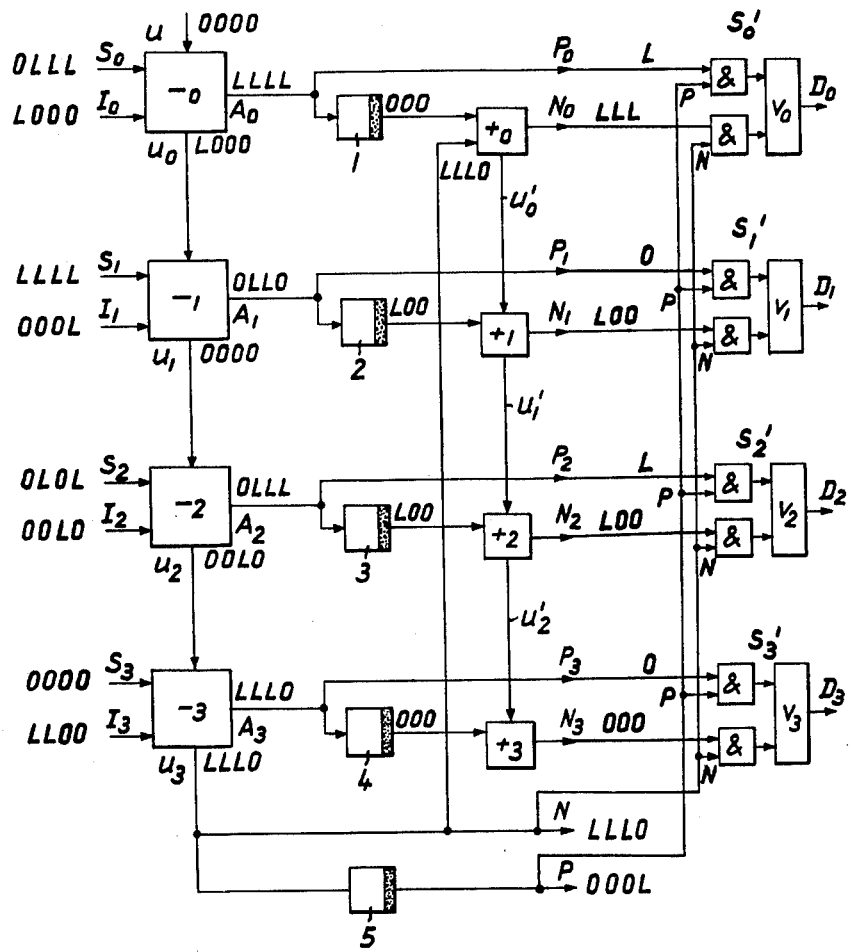
FIGURE 1 is a schematic diagram of a subtracting arrangement according to the present invention.

Referring now to the drawings and to FIGURE 1 thereof in particular, the same shows a subtracting arrangement for processing four-digit natural binary numbers which may, for example, be the nominal and actual values fed to the arrangement from a machine tool control device, it being understood that there can be as many digits as desired; in practice, a machine tool control arrangement will be expanded to handle twenty digits so that commands having a bit width of up to 20 can be processed. It is pointed out, however, that the present invention is not limited to the use of the subtracting arrangement in conjunction with machine tool controls, because the arrangement per se may be used whenever the difference between two numbers has to be determined.

The arrangement depicted in FIGURE 1 comprises a series of subtracters $-_0$, $-_1$, $-_2$, $-_3$, for each binary digit $2^0$, $2^1$, $2^2$, $2^3$. Each subtracter has three inputs. The first of these inputs $S_0$, $S_1$, $S_2$, $S_3$, has applied to it the digit, of the appropriate order, of the binary number which, for instance, represents the nominal value; the second input $I_0$ $I_1$, $I_2$, $I_3$, has applied to it the digit of the same order of the binary number representing the actual value; and the third input is a carry input for receiving the carry from the next lower-order subtracter. The carry input for the lowest-order subtractor $-_0$ is shown at $u$, the value appearing thereat being always equal to 0.

If the circuit is used for controlling a machine tool, the signals 0 or L (L representing the value binary 1) applied to inputs $S_0$ through $S_3$ will come from storage devices which contain the nominal values while the input signals applied to the inputs $I_0$ through $I_3$ will come from suitable gauging means which measure the actual position of the tool relative to the work piece. The subtracters are so arranged as to subtract the actual value I from the nominal value S, i.e., the subtracters perform the operation: S minus I, so that the nominal value is the minuend and the actual value the subtrahend.

Each subtracter has an output carry $u_0$, $u_1$, $u_2$, $u_3$, all but the carry of the highest-order subtracter $-_3$ being connected to the carry input of the next-higher order subtracter.

Each subtracter also has a number output $A_0$, $A_1$, $A_2$, $A_3$, at which appears the numerical difference between the minuend and subtrahend.

When the subtracters carry out a positive subtraction, i.e., a subtraction in which the minuend is larger than the subtrahend, the correct result will appear at the number outputs $A_0$ through $A_3$. If, however, the subtracters carry out a "false" subtraction, i.e., a subtraction in which the minuend is smaller than the subtrahend, the number outputs $A_0$ through $A_3$ of the subtracters will present a value which is the complement of a number which itself is equal to the difference between the smaller nominal value and the larger actual value less L. (It is pointed out, in this connection, that the term "complement," as used throughout the instant specification and claims is intended to refer to the so-called "base-minus-one" complement common in computer technology, rather than the so-called "true" complement. For instance, the "base-minus-one" complement of L000 is 0LLL, while the "true" complement of L000 would be L000, namely, the number which has to be added to the original amount so as to give the least number containing one more digit.)

Each of the number outputs $A_0$ through $A_3$ has a NOT-circuit 1, 2, 3, 4, connected to it which inverts the output appearing at $A_0$ through $A_3$, so that when these outputs present the complement, the latter is inverted by the NOT-circuits.

The output of the NOT-circuit 1 of the lowest-order digits is connected to one input of an adder $+_0$, the other input of which has applied to it the carry $u_3$ coming from the highest-order subtracter $-_3$. This carry $u_3$ is applied to an output N and, via a further NOT-circuit 5 to an output P. The outputs of NOT-circuits 2, 3, 4, are connected to one input of respective adders $+_1$, $+_2$, $+_3$, the other input of each of which is connected to the carry output $u'_0$, $u'_1$, $u'_2$, of the next-lower order adder. In practice, each adder can be a half-adder.

The arrangement is such that when the minuend, e.g., the nominal value, is greater than the subtrahend, e.g., the actual value, the difference is taken from the outputs $P_0$, $P_1$, $P_2$, $P_3$, which are connected directly to the corresponding number outputs $A_0$ through $A_3$, with the fact that the difference is taken directly being indicated by the appearance of a so-called significant signal, i.e., L, at P. Conversely, when the minuend is smaller than the subtrahend, the result is taken from the outputs $N_0$, $N_1$, $N_2$, $N_3$, and this fact is indicated by the appearance of a significant signal (L) at P.

In order to obtain the numerical difference irrespective of whether the minuend is larger or smaller than the subtrahend, the arrangement is provided with logic output stages $S'_0$, $S'_1$, $S'_2$, $S'_3$, each of which contains two AND-circuits &. The outputs $P_0$ through $P_3$ are applied to one input of one AND-circuit, the other input of the latter being connected to output P coming from NOT-circuit 5. Similarly, outputs $N_0$ through $N_3$ are applied to one input of the other AND-circuit, the other input of the latter being connected to output N. The outputs of the two AND-circuits of each output stage $S'_0$ through $S'_3$ are applied to the inputs of an OR-circuit $v_0$, $v_1$, $v_2$, $v_3$, whose outputs $D_0$, $D_1$, $D_2$, $D_3$, constitute the final difference output means of the arrangement and present the numerical difference between the minuend and subtrahend, irrespective of which is larger. The direction of this difference is indicated by what may be deemed the elgebraic sign output means P, N.

The operation of the circuit is shown by way of four examples, noted in FIGURE 1.

The first vertical row shows a nominal value 00L0 (decimal 2) and an actual value L00L (decimal 9), this being a case where the minuend is smaller than the subtrahend. The incoming carry $u$ of subtracter $-_0$ is at all times equal to 0. Thus, there will appear at the outputs $A_0$ through $A_3$ the complement L00L. The subtract 0 minus L in subtracter $-_0$ produces an outgoing carry $u_0=L$. The latter is applied to the input carry of subtracter $-_1$. This subtracter thus subtracts L minus 0 minus the incoming carry to produce, at output $A_1$, the value 0 and the value 0 at carry output $u_1$. The output at $A_2$ is likewise 0, as is the carry output $u_2$ which is applied to subtracter $-_3$. The latter subtracts 0 minus $L=L$, there being an outgoing carry $u_3=L$.

As is apparent from the drawing, the carry $u_3$ of the highest-order binary digit is applied to the adder $+_0$ of the lowest-order digit. Also, the outgoing carry $u_3$ causes the significant signal L to appear at output N, the signal at P being 0. The signal L coming from carry $u_3$ will also open those AND-circuits which receive signals from the adders, the AND-circuits being closed in view of the 0 signal applied to one input of each.

The complement L00L appearing at $A_0$ through $A_3$ is inverted by the NOT-circuits 1, 2, 3, 4, to produce the result 0LL0 which, it will be appreciated, is not yet the correct difference between the original values 00L0 and L00L. This is compensated for as follows. The adder $+_0$ adds to the lowest-order digit 0 the carry L coming from $u_3$, so that the output at $N_0$ will be equal to L. There will be no carry passed on by $u'_0$, or, for that matter, by $u'_1$, $u'_2$, so that there will appear at $N_3$, $N_2$, $N_1$, the values 0LL. The number appearing at all four outputs $N_3$, $N_2$, $N_1$, $N_0$, will thus be the binary number 0LLL (decimal 7), which is the correct difference between the original input values 00L0 and L00L. As mentioned above, the significant signal L at N shows that the difference is negative, i.e., that the minuend was smaller than the subtrahend.

Inasmuch as the lower AND-circuit of each output stage is opened, the above-mentioned difference value 0LLL is applied to the outputs $D_0$ through $D_3$ of OR-circuits $v_0$ through $v_3$.

In the second example, the minuend (nominal value) is 0LLL (decimal 7) and the subtrahend (actual value) is L000 (decimal 8). The values produced at the number outputs $A_0$ through $A_3$ and carry outputs $u_0$ through $u_3$ is again noted in FIGURE 1. Inasmuch as the carry $u_3$ of the highest-order subtracter is again L, the adder $+_0$ of the lowest-order again performs an addition so that the binary number 000L (decimal 1) appears at the outputs $N_3$ through $N_0$, this value being passed on through to the output stages. Again, the fact that the minuend was smaller than the subtrahend is indicated by the presence of the significant signal L appearing at output N.

In the third example, the minuend is 00LL (decimal 3) and the subtrahend 0L00 (decimal 4), so that the number 000L is again presented at the output stages, and the fact that the minuend was smaller than the subtrahend is again indicated by L at N.

In the fourth example, the minuend 0LLL (decimal 7) is greater than the subtrahend 00L0 (decimal 2). In this case, the carry $u_3$ coming from the highest-order subtracter will be 0 so that nothing is, or needs to be, added in adder $+_0$. Indeed, the adders will be of no import for this positive operation, because the signal 0 at N will block the lower AND-circuit of each output stage so that the values coming from the adder outputs $N_0$ through $N_3$ can not be passed on. Instead, the significant signal L appearing at output P will open the upper ones of the AND-circuits so as to pass on to the output stages the numbers appearing at outputs $A_0$ through $A_3$ of the subtracters, the latter, it being pointed out, already being a correct indication of the numerical difference between the original input values 0LLL and 00L0. The fact that, in this example, the minuend was larger than the subtrahend is indicated by the appearance of a significant signal, i.e., L, at output P.

FIGURE 2 shows one embodiment of a subtracter which may be used in the circuit of FIGURE 1. The subtracter comprises five AND-circuits $\&_1$, $\&_2$, $\&_3$, $\&_4$, $\&_5$, and three OR-circuits $v_1$, $v_2$, $v_3$. The OR-circuit $v_2$ has its output connected to a NOT-circuit N and the OR-circuit $v_3$ has its output connected to an OR NOT-circuit N'. The inputs of the subtracters are shown at $\overline{S}_0$, $I_0$ and $u$ the output being shown at $A_0$ and the outgoing carry at $u_0$. As shown in FIGURE 2, the OR-circuit $v_2$ is combined with the NOT-circuit N to form an OR/NOT-circuit having affirmed and negated outputs, while the OR-circuit $v_3$ is combined with the OR/NOT-circuit N' to form an OR/OR NOT-circuit also having affirmed and negated outputs.

The detailed description and the operation of the circuit will now be presented, it being assumed that the nominal and actual value inputs are 0 and L, respectively. The subtracter shown is that assigned to the lowest-order digit.

As shown in FIGURE 2, it is the negated signal $\overline{S}_0=L$ rather than the signal 0 which is applied to the input of the subtracter. This signal is readily derived from the signal $S_0=0$ of FIGURE 1 by means of a conventional NOT-circuit (not shown). The carry applied to $u=0$. The signal $I_0$ has the value L. These signals LL0 are applied to the first AND-circuit $\&_1$, at whose output appears the value 0. The signals $\overline{S}_0$, $I_0$ and $u$ are also applied to the OR-circuit $v_1$, so that there appears at the output of this OR-circuit the signal L. The AND-circuit $\&_2$ has applied to it the signal $I_0$ and $u$ having the values 0 and L, respectively. The output of this AND-circuit is thus 0. The AND-circuit $\&_3$ has applied to it the signals $\overline{S}_0$ and $u$ having the values L and 0, respectively, so that output of this AND-circuit is 0. The AND-circuit $\&_4$ has applied to it the signals $\overline{S}_0$ and $I_0$ each of which has the value L, so that the output of this AND-circuit is L.

The outputs of AND-circuit $\&_2$, $\&_3$, $\&_4$, are applied to the inputs of OR-circuit $v_3$, whose output is, as stated above, connected to the OR/NOT-circuit N'. The signal L appears at the affirmed output $u_0$ of N' and the signal 0 appears at the negated output $\overline{u}_0$. This negated signal 0 of output $\overline{u}_0$ is applied to the AND-circuit $\&_5$, the other input of which already has applied to it the signal L coming from OR-circuit $v_1$. Thus, there appears at the output of AND-circuit $\&_5$ the signal 0. Consequently, there are two signals 0 applied to the inputs of OR-circuit $v_2$, and the output $A_0$ of the NOT-circuit N will therefore present the signal L.

The subtracter has thus carried out the subtraction 0 minus $L$, producing at its number output $A_0$ the result L, there being an outgoing carry $u_0=L$ which is applied to the next-higher order subtracter. If the subtracter just described had been the highest-order subtracter, the carry output would have been applied to one input of adder $+_0$, and there would have been an incoming carry at $u$ of either 0 or L, depending upon what subtraction the next-lower order subtracter carried out.

In the second numerical example shown in FIGURE 2, $S_0=L$ and $I_0=0$. Therefore, $\overline{S}_0=0$. The output of AND-circuit $\&_1$ presents the signal 0, as does the output of OR-circuit $v_1$. The outputs of AND-circuits $\&_2$, $\&_3$, $\&_4$, likewise present the signal 0. The outgoing carry $u_0$ is 0. The negated signal L at the output $\overline{u}_0$ of the OR/NOT-circuit N' is applied to AND-circuit $\&_5$, at whose output there appears the signal 0. The input signals of OR-circuit $v_2$ are 0 and at the output $A_0$ of the NOT-circuit N appears the value L.

The subtracter has thus carried out the subtraction $L$ minus 0, producing the result L, there being an outgoing carry equal to 0.

It will be seen from the above that the operation of the subtracters may be expressed, in Boolean algebra, as follows:

$$[(\overline{S}_0 \vee I_0 \vee u) \& \overline{u}_0] \vee [\overline{S}_0 \& I_0 \& u] = A_0$$
$$(\overline{S}_0 \& I_0) \vee (\overline{S}_0 \& u) \vee (I_0 \& u) = u_0$$

If desired, it is possible to use instead of the negated input signal $\overline{S}_0$ and the affirmed input signals $I_0$, $u$, affirmed input signal $S_0$ and negated input signals $\overline{I}_0$, $\overline{u}$.

FIGURE 3 is a circuit diagram of a subtracter such as may be used in the arrangement of FIGURE 1. The subtracter is made up substantially exclusively of diodes constituting the various AND-circuits and OR-circuits, together with the operating resistances, a transistor $T_1$ operating as the NOT-circuit N from whose number output $A_0$ the result is taken off, and two further transistors $T_2$, $T_3$, having the outputs $\overline{u}_0$, $u_0$, this two-stage switching amplifier N' being controlled by the OR-circuit $v_3$.

The circuit is fed by a positive and a negative direct current voltage of approximately 12 volts. As shown in FIGURE 3, all of the electrical components are galvanically coupled to each other so that the entire circuit is insensitive to external noise pulses or voltages. The binary numbers 0 or L are realized by corresponding D.C. voltage signals which are not called upon to meet any particular specification. In the illustrated circuit, the binary number L corresponds, for example, to a D.C. voltage signal of −12 volts (0 volts being the reference) and the binary number 0 corresponds to a D.C. voltage signal of about 0 volts.

It will be understood that the above description of the present invention is susceptible to various modifications, changes, and adaptations, and the same are intended to be comprehended within the meaning and range of equivalents of the appended claims.

What is claimed is:

1. An arrangement for subtracting a binary subtrahend from a binary minuend, which arrangement puts out the amount of the difference between the numbers and a signal representative of the algebraic sign of said difference, said arrangement comprising, in combination:
    (a) a series of subtracters each being assigned to a respective order, each subtracter having
        (1) a number output,
        (2) a carry output,
        (3) a first input for receiving a digit from the minuend, and
        (4) a second input for receiving a digit from the subtrahend which is of the same order as the digit from the minuend, and the carry input of each subtracter, except the one assigned to the lowest order, also having a carry input connected to the carry output of the next-lowest order subtracter;
    (b) a series of inverters each being assigned to a respective digit and having its input connected to the number output of the respective subtracter;
    (c) a series of adders each being assigned to a respective digit, each adder having two input and a number output, one input of each adder being connected to the output of the respective inverter, the adder assigned to the lowest-order digit having another input which is connected to the carry output of the highest-order subtracter and the other adders each having another input connected to a carry output of the next-lower order adder;
    (d) algebraic sign output means connected to the carry output of said subtracter assigned to the highest order for producing a signal which is indicative of the presence or absence of a carry at said last-mentioned carry output and hence indicative of whether or not the difference appearing at said number outputs is a true difference;
    (e) difference output means;
    (f) means responsive to said algebraic sign output means for applying the difference appearing at said number outputs of said subtracters to said difference output means when there is no carry signal at said carry output of said highest-order subtracter; and
    (g) means responsive to said algebraic sign output means for applying the difference appearing at the number outputs of said adders to said difference output means when there is a carry signal at said carry output of said highest-order subtracter.

2. An arrangement as defined in claim 1 wherein said algebraic sign output means has a first output for producing a signal when there is a carry appearing at the carry output of said subtracter of the highest order and a second output for producing a signal when there is no carry appearing at said last-mentioned carry output.

3. An arrangement as defined in claim 1 wherein each of said subtracters comprises logic circuit means operating according to the following function:

$$[(\overline{S}_0 \vee I_0 \vee u) \& \overline{u}_0] \vee [\overline{S}_0 \& I_0 \& u] = A_0$$
$$(\overline{S}_0 \& I_0) \vee (\overline{S}_0 \& u) \vee (I_0 \& u) = u_0$$

4. An arrangement as defined in claim 1 wherein each of said subtracters comprises logic circuit means operating according to the following function:

$$[S_0 \vee \overline{I}_0 \vee \overline{u}) \& \overline{u}_0] \vee [S_0 \& \overline{I}_0 \& \overline{u}] = A_0$$
$$(S_0 \& \overline{I}_0) \vee (S_0 \& \overline{u}) \vee (\overline{I}_0 \& \overline{u}) = u_0$$

5. An arrangement as defined in claim 1 wherein each of said subtracters, except the one assigned to the lowest order, comprises:

(A) a first AND-circuit for receiving the digits of the numbers and a composite carry signal derived from another subtracter and from the carry of the subtracter itself;
(B) an OR-circuit for receiving the digits of the numbers and said composite carry signal;
(C) a second AND-circuit for receiving the digits of the numbers;
(D) a third AND-circuit for receiving one of the digits and said composite carry signal;
(E) a fourth AND-circuit for receiving the other of said digits and said composite carry signal;
(F) an OR/OR NOT-circuit having its inputs connected to the outputs of said second, third and fourth AND-circuits, said OR/OR NOT-circuit having affirmed and negated outputs, said affirmed outputs constituting the carry output of the respective subtracter;
(G) a fifth AND-circuit having one input connected to the output of said OR-circuit and another input connected to said negated output of said OR/OR NOT-circuit; and
(H) an OR/NOT-circuit having one input connected to the output of said first AND-circuit and another input connected to the output of said fifth AND-circuit, the output of said OR/NOT-circuit constituting the number output of the respective subtracter.

References Cited by the Examiner

UNITED STATES PATENTS

| | | | |
|---|---|---|---|
| 2,907,877 | 10/1959 | Johnson | 235—177 |
| 3,010,654 | 11/1961 | Ketchledge | 235—175 |

ROBERT C. BAILEY, *Primary Examiner.*

M. J. SPIVAK, *Assistant Examiner.*